March 12, 1957     S. JENSEN     2,785,007
AUTOMATIC VALVE CONTROL FOR SPRINKLER SYSTEMS
Filed July 17, 1953     2 Sheets-Sheet 1
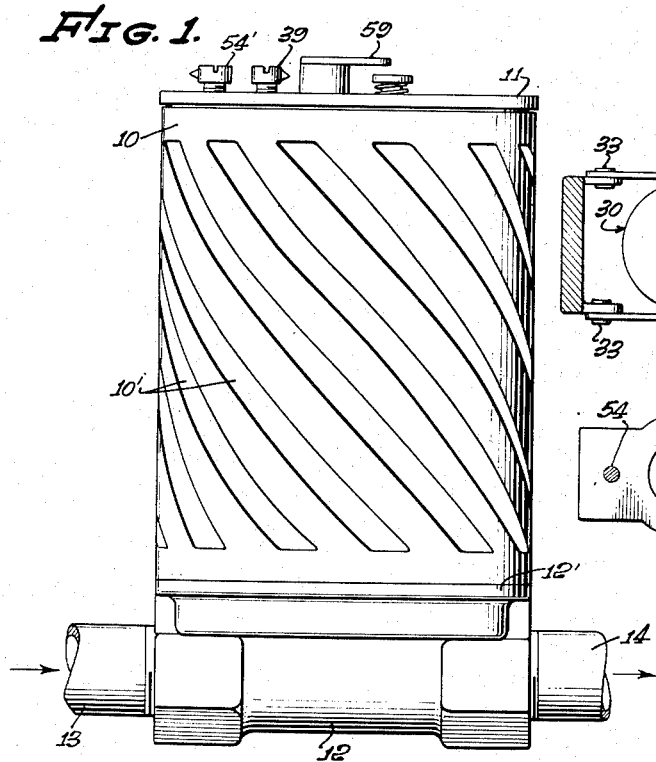
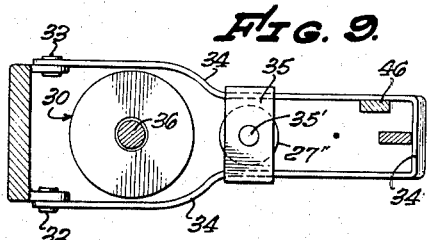
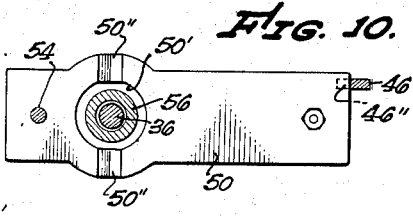
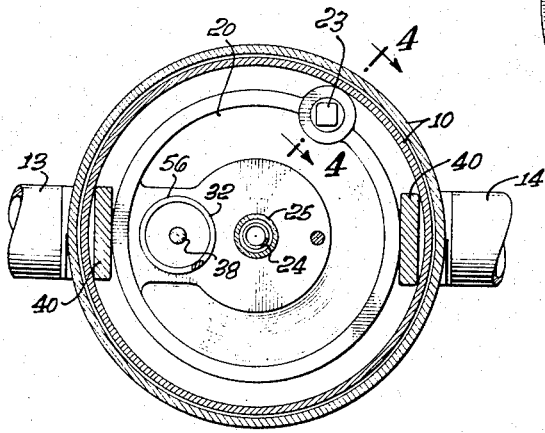
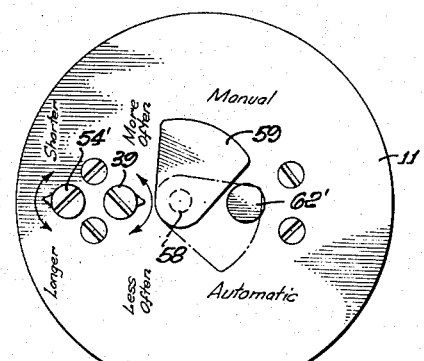
SCOTT JENSEN,
INVENTOR.
BY
ATTORNEY.

March 12, 1957
S. JENSEN
2,785,007
AUTOMATIC VALVE CONTROL FOR SPRINKLER SYSTEMS
Filed July 17, 1953
2 Sheets-Sheet 2
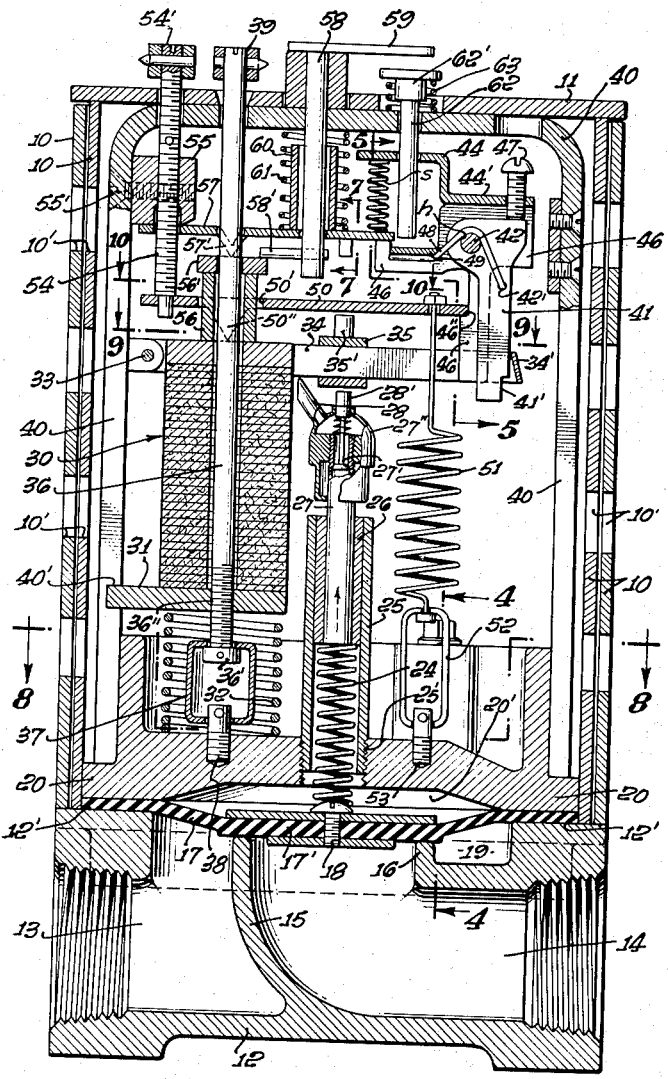
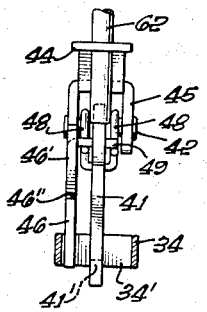
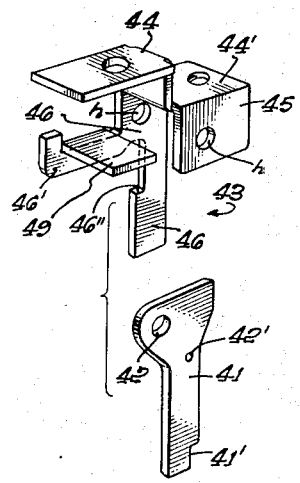
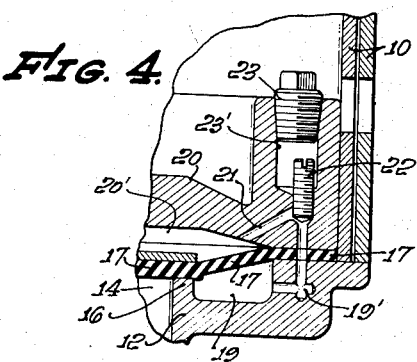
SCOTT JENSEN,
INVENTOR.

United States Patent Office 2,785,007
Patented Mar. 12, 1957

2,785,007
AUTOMATIC VALVE CONTROL FOR SPRINKLER SYSTEMS

Scott Jensen, Los Angeles, Calif.

Application July 17, 1953, Serial No. 368,794

5 Claims. (Cl. 299—25)

This invention relates to automatic valve controls for sprinkling systems, and the like, and it has among its salient objects:

To provide a valve control mechanism which is designed to operate automatically in the control of a sprinkling system, or other watering mechanism, and in such a manner that the water is supplied strictly according to the need of the lawn, plants, or for the soil moisture, whereby in dry weather the valve will operate to discharge water at relatively frequent intervals, while on rainy or foggy days no water would be discharged;

To provide an automatic valve control mechanism in which a fibre or other suitable material, in the form of a stack or unit, and which expands with moisture and contracts with dryness or lack of moisture, is utilized to automatically manipulate the control valve for said system;

To provide in connection with such an automatically controlled sprinkling system, means whereby the automatic feature can be rendered inoperative, and a manual control used when desired.

Other objects and advantages of the invention will be apparent from the following detailed description of one practical embodiment thereof, taken with the accompanying two sheets of drawings, in which—

Figure 1 is a side elevation of a body or housing within which my improved automatic mechanism is housed;

Figure 2 is a top plan view thereof;

Figure 3 is an enlarged vertical sectional view through the mechanism as seen in Fig. 1;

Figure 4 is a fragmentary sectional view taken on line 4—4 on Fig. 3, and Fig. 8;

Figure 5 is a view showing a detail at the position of line 5—5 on Fig. 3;

Figure 6 is a perspective view of parts removed from the position of line 5—5, Fig. 3;

Figure 7 is a detail at line 7—7, Fig. 3;

Figure 8 is a horizontal sectional view taken on line 8—8, of Fig. 3;

Figures 9 and 10, are views on lines 9—9, and 10—10, Fig. 3.

Referring now more in detail to the drawings, the invention as here illustrated for explanatory purposes, is inclosed in a cylindrical case or housing, including two cylinders 10, 10, one within the other, and each having the spiral slots or openings 10' therein, whereby, when turned relative to each other, said slots or openings are opened or closed, more or less, as may be desired. A top plate or cover 11 is shown, and at the bottom a casting 12 is provided, having formed therein an inlet chamber with provision for connecting a pipe thereto, as at 13, and at the opposite side an outflow chamber with pipe connection therefor, as at 14. The top surface of said casting 12, as at 12', and a partition wall 15, and a seat portion 16, all formed in said base casting 12, provide a seat for a diaphragm 17, having a valve body 17' as a part thereof, as shown in Fig. 3, and including two disc members secured together by means of a screw bolt 18, with the diaphragm therebetween.

There is also formed in said base casting 12, a small chamber, as 19, seen in Fig. 4, with a port 19' therefrom, and extended upwardly through the edge of the diaphragm and into a top casting 20, which seats upon the diaphragm, around its edge, as shown, said casting 20 having a clearance space, as 20', formed on its under side. In said casting 20, above the diaphragm 17, is an angular port 21, communicating with the upper end of the port 19', and both being adapted to be closed, or opened, by a screw valve 22, as will be understood from the showing. Access to this screw valve 22 is controlled by a plug 23, in the chamber 23', formed in said casting 20.

A coiled spring 24 is shown in a tube 25, the lower end of which is screwed into the casting 20, as at 25'. Said spring bears down on the center bolt 18 of the diaphragm 17, to keep it normally seated on the valve seats, 15, 16, in the base casting 12, as shown. An inner sleeve 26 is shown in the upper portion of the tube 25, bearing at its lower end on the upper end of said spring 24.

A tube 27 is shown extended down into said inner tube 26, in open communication through said spring to the clearance space 20' in the under side of casting 20. In the upper end of said tube 27 is a small valve, similar to the valve in a tire tube, as at 27', with a cap 27" thereon, like the cap of the tire tube or valve. A short nozzle, as 28, is inserted through the side of said cap and welded, or otherwise secured in place, and a plunger, as 28' is inserted through an opening in its top, as indicated, capable of being pressed inwardly to open the valve 27' in the tube 27 to permit the discharge of a spray of water on to a stack 30, through the short nozzle 28.

I will now describe the moisture sensitive unit which automatically controls the operation of the invention. The stack or unit is designated 30, and may be composed of disc-like parts, of fibre, or any other suitable material, adapted to be moistened by water from the short discharge nozzle 28, before referred to, whereby said unit expands with the moisture therein. This stack or unit rests on a base plate 31, under which is a coiled spring 32, resting at its lower end in the casting 20, as seen in Fig. 3.

Pivotally connected at 33, is a forked lever 34, encircling the top of said stack or unit 30, as indicated in Fig. 9. On said lever is an operating member 35, in line with the plunger 28', in the valve cap 27".

Extending through said stack or unit 30, and said forked lever 34, is a shaft or bolt 36, the lower end of which is provided with a yoke 37, in the spring 32, said yoke having on its lower end a short anchor stud 38, screwed into the casting 20, as indicated. The lower end of said shaft or bolt 36 is provided with a collar 36', with set screw as shown. Said bolt is also threaded in the plate 31, as at 36". At its upper end said bolt is provided with a head or knob 39, by means of which said bolt can be turned, whereby to raise or lower the base plate 31, on which the stack or unit rests, thus making it possible to raise and lower the stack or unit, in adjustments which may be necessary or advisable for accuracy. This knob 39 can also be seen in Figs. 1 and 2.

An arch-like band 40, has its opposite sides immediately inside the outer case or housing 10, 10, with its top across the top, under the top plate 11, as seen in Fig. 3. The rod or bolt 36 extends through the top part of this arch 40, and the top plate 11, and also through the base plate 31, under the stack or unit 30. Said base plate 31 has its outer end forked to move on said band 40, as at 40', to keep it from turning.

The forked lever or arm 34, pivoted at 33, to the arch member 40, at its opposite end, is provided with a latch end or lip 34', as seen in Figs. 3 and 9. Said forked lever also has thereon, a U-shaped band like member 35, with a pin or stud 35' therein, and by means of which the lever or arm 34 can be moved down to engage and depress the plunger 28' for opening the valve 27' to permit spraying the stack 30, before referred to.

A latch mechanism is provided above the narrower end of the lever 34, and its lip 34', which includes a depending latch member 41, pivoted at its upper end, at 42, in an angle combination, designated as a whole 43, Fig. 6. The top of said angle combination includes a bent plate 44 and 44', the opposite sides of the part 44' being bent down, as at 45 and 46, the part 46 having formed thereon a forwardly extending finger 46' upturned at its end, and under said finger is a notch 46'', formed in the front edge of said extension 46, as seen in Fig. 6. The depending latch member 41, at its upper end is pivoted between the sides 45 and 46, through the holes h, h, and the hole 42 in said member 41. A set screw 47, in the top member 44', bears on the top or toe part of said latch member 41, as indicated in Fig. 3, for adjustment purposes, around its pivotal axis 42. The lower end of said latch member 41 is provided with a notch, or shoulder 41', positioned to catch on the inclined toe 34', at the outer end of the lever or arm 34. An angle spring, as 48, is shown bent over the pivot at 42, with one arm connected through the depending latch lever 41, as at 42', while the other end underlies a wing 49, on the finger 46', whereby said depending latch member 41 is normally pressed outwardly, to catch in the notch 41' on the toe 34' of the lever 34, when said lever 34 is depressed, thus holding it down.

Another cross bar or member, designated 50, has its right end resting on the notch or shoulder 46'', in the depending latch member 41, as seen in Fig. 3, with a coiled spring and stem, as 51, holding it down as shown. The lower end of said spring 51 is connected with a yoke 52, the lower end of which is anchored in the casting 20, as by means of a stud 53.

The opposite end of said bar or member 50 has an opening 50' therethrough, and at its opposite sides, said member has formed therein downwardly pointed knife bearings, as 50'', bearing on top of the stack 30, as indicated by light broken lines seen through the bolt 36, Fig. 3. The end of said member 50 has a hole therethrough in which is the lower end of a vertical bolt or pin 54, threaded through a fixed block 55, secured on the arch member 40, as by screw 55'. The upper end of said bolt 54 is provided with an indicating head 54', and by means of which it can be turned to move the end of the member 50, or to hold it in an adjusted position.

Mounted on top of the stack 30 is a short bushing 56, having a top flange 56', and through which the bolt 36 extends, as shown in Fig. 3, and over which the hole 50' in the cross member 50, loosely fits, as seen in Fig. 3.

Another cross member, designated 57 is shown, through which the pin 54 passes, at its left end, and through which the bolt 36 also passes, as shown, and also through which another pin 58 passes, said pin 58 being provided on its lower end with a finger 58' adapted to be turned to overlie the short bushing 56, on the stack 30, as indicated. The upper end of said pin 58 is provided with an operating and indicating segment, designated 59, and is seen in Figs. 1 and 2. Said cross member 57 is provided on its under side with a knife-edge bearing 57', resting on the bushing top 56', as shown.

A short sleeve 60 is shown seated on the cross member 57, around the bolt 58, and around this short sleeve is a coiled spring 61, bearing at its upper end under the arch member 40, and at its lower end, on the cross member 57, the end of said cross member 57 resting on the upturned toe portion of the finger 46', with a spring S to press latch 46 toward member 50, as member 57 is moved up by the expanding stack 30.

Mounted through the top plate 11, and the top of the arch 40, is a push pin 62, having a head 62' on its upper end, and under which is a short coiled spring 63, bearing on the top plate 11, as shown. Said push pin also passes through the top part 44 of the angle combination, as seen in Fig. 3. This pushpin makes it possible to manually trip the control mechanism, when the segment 59 has been turned as shown in Fig. 2, and start the sprinkler. The segment 59 is turned to the manual position when it is desired to render the automatic opening of the valve inoperative, as when a garden party is to be held.

The watering can be started any time by pushing down the push pin 62, as before referred to, and providing the stack is dry enough to permit watering to take place, and said segment 59 has been turned. It will continue until the stack is sufficiently extended to effect the closing of the valve.

The frequency of watering is determined by means of the head or knob 39 on the adjustment bolt or screw 36. By this bolt the base plate 31 can be raised or lowered. In this manner the adjustment is made of the degree of moisture or dryness to which the stack is exposed before the main valve is closed or opened.

The duration of each watering period is determined by turning knob 54'. This will change the position of the lever or member 50, in relation to the lever or arm 57, and cause the watering period to be changed after the main valve has been opened.

I am aware that many changes in the construction and arrangement as here shown and described can be made without departing from the spirit of the invention; that it can be used in many places and for different purposes; that it can be buried under ground in some places for controlling different watering systems, and water flow for any purpose, and I do not, therefore, limit the invention to the showing made or the purposes designated, except as I may be limited to a reasonably broad interpretation of the claims hereto appended and forming a part of this specification and application.

I claim:

1. In combination with a sprinkler system, means for automatically turning on and turning off said sprinkler system, said means including confined material which is expansible by moisture and contractible by dryness, valve means operable for opening and closing water to said sprinkler system, and operating connections from said expansible material for operating said valve means to open and close it with the expansive movement and contracting movement of said material, respectively, and means for directing a spray of water onto said expansible material during the operation of said sprinkler system, whereby to automatically close said valve means and shut off said sprinkler system.

2. A combination as set forth in claim 1 which includes a case or housing for said mechanism and manually operable means for admitting and cutting off the admission of atmospheric air to said housing.

3. Means for automatically turning on and turning off a sprinkler system as set forth in claim 1, which includes means for regulating the frequency and the time period of the sprinkling operation.

4. Means for automatically turning on and turning off a sprinkler system as set forth in claim 1, which includes means for rendering the automatic control inactive and making manual control operative.

5. An automatic valve control mechanism for sprinkler systems and the like including a housing therefor, means for connecting a supply of water therethrough, means for connecting the same with a sprinkler system, a valve therein for controlling the flow of water to and from said housing, means for automatically opening and closing said valve, said means including a stack of material which is expansible with moisture and contractible with dryness, a member movable with the expansion movement of said stack, operating connections from said member to said valve for operating said valve, means within said housing for directing a spray of water on said stack during the sprinkling operation for expanding it, whereby to close said valve, and means in said housing and adjustable for regulating the frequency of the sprinkling operation.

References Cited in the file of this patent

UNITED STATES PATENTS

| | | |
|---|---|---|
| 1,675,302 | Roemer | June 26, 1928 |
| 1,755,276 | Somers | Apr. 22, 1930 |
| 2,577,337 | Lancaster | Dec. 4, 1951 |
| 2,612,901 | Milano | Oct. 7, 1952 |